United States Patent
Soga

(10) Patent No.: US 7,014,277 B2
(45) Date of Patent: Mar. 21, 2006

(54) VEHICULAR BRAKING CONTROL APPARATUS AND ABNORMALITY DETECTION METHOD FOR VEHICULAR BRAKING APPARATUS

(75) Inventor: Masayuki Soga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1 day.

(21) Appl. No.: 10/765,135

(22) Filed: Jan. 28, 2004

(65) Prior Publication Data

US 2004/0183369 A1     Sep. 23, 2004

(30) Foreign Application Priority Data

Feb. 17, 2003   (JP)   ............... 2003-038538

(51) Int. Cl.
    *B60T 8/88*   (2006.01)
(52) U.S. Cl. ............... 303/122; 303/113.4; 303/113.2; 303/DIG. 4; 303/116.2; 303/122.11
(58) Field of Classification Search ............... 303/10, 303/116.2, 113.4, 113.2, DIG. 3, DIG. 4, 303/122, 122.11
    See application file for complete search history.

(56) References Cited

U.S. PATENT DOCUMENTS

| | | | |
|---|---|---|---|
| 5,588,718 A * | 12/1996 | Winner et al. ........... 303/113.1 |
| 5,887,954 A * | 3/1999 | Steiner et al. ........... 303/113.4 |
| 5,941,608 A * | 8/1999 | Campau et al. .......... 303/113.4 |
| 6,076,897 A * | 6/2000 | Binder et al. ............ 303/116.1 |
| 6,079,793 A * | 6/2000 | Takayama et al. ............ 303/14 |
| 6,123,397 A | 9/2000 | Ohtomo et al. |
| 6,158,825 A * | 12/2000 | Schunck et al. ......... 303/115.4 |
| 6,290,310 B1 * | 9/2001 | Kusano ................. 303/122.11 |
| 6,425,644 B1 * | 7/2002 | Kawahata et al. .......... 303/122 |
| 6,450,591 B1 | 9/2002 | Kawahata et al. |
| 6,572,200 B1 * | 6/2003 | Soga et al. ..................... 303/3 |
| 6,595,599 B1 | 7/2003 | Soga |

FOREIGN PATENT DOCUMENTS

| | | |
|---|---|---|
| DE | 100 15 810 A1 | 6/2001 |
| JP | A 10-100884 | 4/1998 |
| JP | A 11-59389 | 3/1999 |
| JP | A 2002-187537 | 7/2002 |

* cited by examiner

*Primary Examiner*—Matthew C. Graham
*Assistant Examiner*—Mariano Sy
(74) *Attorney, Agent, or Firm*—Oliff & Berridge, PLC

(57) ABSTRACT

In an electronic control brake system capable of controlling the braking force by adjusting the hydraulic pressure applied to each wheel cylinder through the use of a pressurization source and a hydraulic pressure adjusting portion, the hydraulic pressure applied to a wheel cylinder is increased by a pressurization source while the brake is not operated during a stop of the vehicle. After that, a master cutoff valve is opened so as to release the hydraulic pressure to a master cylinder. Changes in the master pressure are investigated via a master pressure sensor so as to determine whether there is an abnormality in a stroke simulator or a simulator cutoff valve.

19 Claims, 7 Drawing Sheets

VEHICULAR BRAKING CONTROL APPARATUS AND ABNORMALITY DETECTION METHOD FOR VEHICULAR BRAKING APPARATUS

INCORPORATION BY REFERENCE

The disclosure of Japanese Patent Application No.2003-38538 filed Feb. 17, 2003, including the specification, drawings and abstract, is incorporated herein by reference in its entirety.

BACKGROUND OF THE INVENTION

1. Field of the Invention

The invention relates to a vehicular braking control apparatus and, more particularly, to a vehicular braking control apparatus having a function of detecting an abnormality of a stroke simulator among vehicular braking control apparatuses that electronically control the braking force applied to wheels of a vehicle. The invention also relates to an abnormality detection method for a vehicular braking apparatus and, more particularly, to a method for detecting an abnormality of a stroke simulator.

2. Description of the Related Art

A known braking control apparatus of a vehicle is a control apparatus (electronically controlled brake) that electrically controls the hydraulic pressure supplied to a wheel cylinder for actuating a braking apparatus. Such a control apparatus, if an abnormality occurs in the control system, stops the electrical control, and supplies hydraulic pressure from a master cylinder that generates a hydraulic pressure corresponding to the amount of brake operation, thereby starting a manual control. Therefore, technologies for reliable determination regarding abnormality of the control system and the braking apparatus have been developed (e.g., Japanese Patent Application Laid-Open Publication No. 10-100884 (paragraphs [0078] to [0093], and FIG. 6), and Japanese Patent Application Laid-Open Publication No. 11-59389 (paragraphs [0081] to [0099], and FIG. 3).

The technology disclosed in Japanese Patent Application Laid-Open Publication No.10-100884 detects the state of operation of hydraulic pressure sensors used for the aforementioned determination, and determines whether there is a sensor abnormality by temporarily allowing conduction through the hydraulic pressure passageway where each sensor is disposed and then comparing the outputs of the hydraulic pressure sensors.

The technology disclosed in Japanese Patent Application Laid-Open Publication No. 11-59389 locates a fault on the basis of the wheel cylinder pressures that occur during the pressurization via the master cylinder and during the electrically controlled pressurization.

During the electronic control in such an electronically controlled brake, the hydraulic fluid of the wheel cylinder and the hydraulic fluid of the master cylinder are disconnected from each other, and therefore, the resistance to the operation of the brake pedal performed by a driver is insufficient if no particular device is provided. To cause the brake pedal to produce a reaction force corresponding to the amount of pedal operation, a stroke simulator is disposed. If this stroke simulator portion has an abnormality, such as liquid leakage or the like, while the electronically controlled braking system (including the braking control system) does not have an abnormality, there is no problem in the braking control. However, if pressurization via the master cylinder is attempted in the event of abnormality of the electronically controlled braking system, there is a possibility of a reduction in the pressurization provided that the stroke simulator has an abnormality. Therefore, it is necessary to detect whether the stroke simulator has an abnormality. However, since the stroke simulator is disposed outside the electronically controlled braking system, an effective technique for the abnormality detection has not been found.

SUMMARY OF THE INVENTION

It is an object of the invention to provide a vehicular braking control apparatus adapted to an electronically controlled brake which is capable of determining whether a stroke simulator portion has an abnormality, and a method for detecting an abnormality of the stroke simulator.

A first aspect of the invention relates to a vehicular braking control apparatus that comprises: a master cylinder that generates a hydraulic pressure corresponding to a brake operating force; a first communication passageway that connects the master cylinder and a wheel cylinder of a braking apparatus in communication; a first open-close valve disposed on the first communication passageway; a stroke simulator that is connected to the first communication passageway between the first open-close valve and the master cylinder and that provides a reaction force corresponding to the brake operating force; a pressurization source that generates a predetermined hydraulic pressure; a hydraulic pressure adjusting portion that connects the pressurization source and the first communication passageway between the first open-close valve and the wheel cylinder and adjusts the hydraulic pressure applied to the wheel cylinder; a hydraulic pressure sensor that detects the hydraulic pressure on the first communication passageway between the first open-close valve and the master cylinder; and a control portion that controls actuation of the first open-close valve and operation of the hydraulic pressure adjusting portion. While a brake is not operated, the control portion increases the hydraulic pressure on a wheel cylinder side of the first communication passageway via the hydraulic pressure adjusting portion while the first open-close valve is closed, and then opens the first open-close valve, and determines whether there is an abnormality of the stroke simulator based on a change in outputs of the hydraulic pressure sensor before and after the first open-close valve is opened.

While the brake is not operated, that is, while the hydraulic pressure from the master cylinder is not applied, the first open-close valve is closed, and then is opened after the wheel cylinder-side hydraulic pressure in the first communication passageway is increased. Therefore, the hydraulic pressure is released from the wheel cylinder side to the master cylinder side of the first open-close valve. As a result, a temporarily pressure increase is detected by the hydraulic pressure sensor. If in this case there is an abnormality on the stroke simulator side, the pressure change detected by the sensor is different from a pressure change that occurs during a normal state. Thus, determination regarding abnormality of the stroke simulator side can be accomplished based on a result of pressure measurement performed by the hydraulic pressure sensor.

A second aspect of the invention relates to a method for detecting an abnormality of a braking apparatus that has a stroke simulator that provides a reaction force corresponding to a brake operating force. A first open-close valve is disposed on a communication passageway that connects in communication a wheel cylinder of the braking apparatus and a master cylinder that generates a hydraulic pressure corresponding to the brake operating force, and the stroke simulator is connected to the communication passageway between the first open-close valve and the master cylinder.

The method includes the steps of: increasing a hydraulic pressure on a wheel cylinder side of the communication passageway while the first open-close valve is closed while a brake is not operated; opening the first open-close valve after increasing the hydraulic pressure on the wheel cylinder side; measuring a hydraulic pressure in a communication passageway between the first open-close valve and the stroke simulator which occur before and after the first open-close valve is opened; and determining whether there is an abnormality of the stroke simulator based on a change in the measured hydraulic pressure.

According to the second aspect of the invention, it becomes possible to perform abnormality detection regarding the stroke simulator as in the above-described first aspect.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
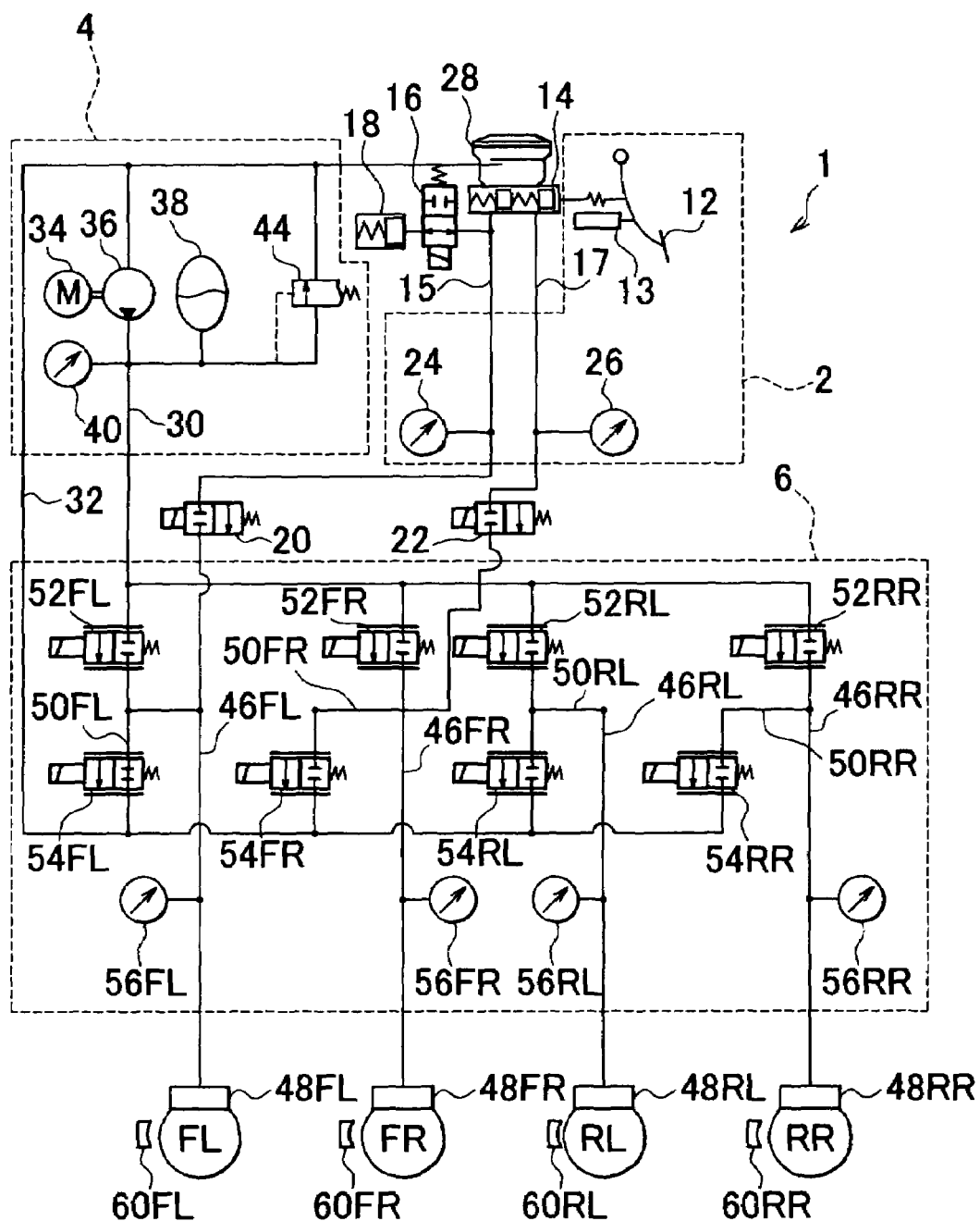
FIG. 1 is a hydraulic pressure system diagram of a brake system that includes a vehicular braking control apparatus in accordance with the invention.

Preferred embodiments of the invention will be described in detail hereinafter with reference to the accompanying drawings. To facilitate the understanding of the description, the same component elements shown in the drawings will be indicated by the same reference characters, and redundant descriptions thereof will be avoided as much as possible.

Figure 2:
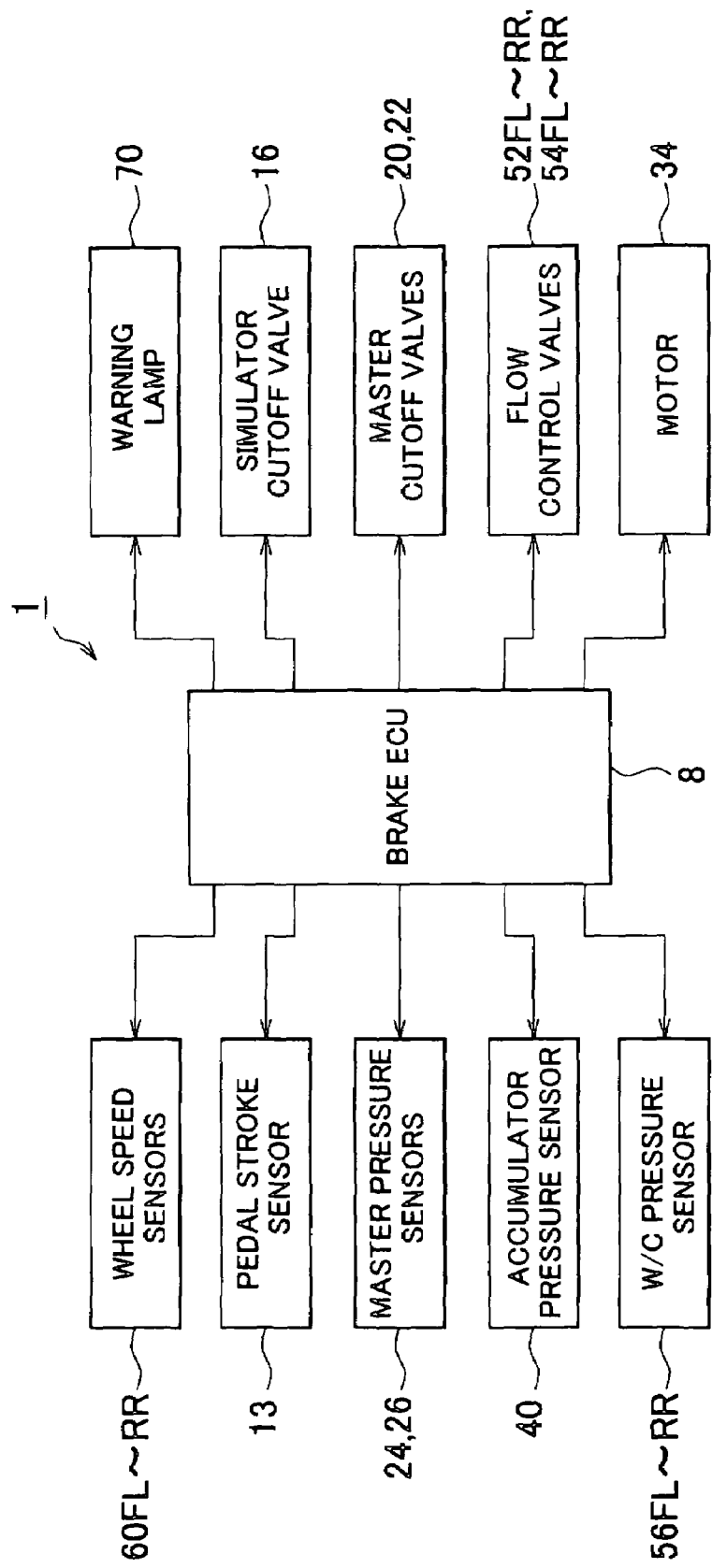
FIG. 2 is a block diagram illustrating an electronic control system of the brake system shown in FIG. 1.

FIG. 1 is a hydraulic pressure system diagram of a brake system that includes a vehicular braking control apparatus. FIG. 2 is a block diagram illustrating an electronic control system of the brake system. This brake system is an electronic control brake system that allows the EBD (electronic brake force distribution) control of adjusting the distribution braking force to each wheel via electronic control or the ABS (anti-lock brake system) control of preventing each wheel from locking. This brake system may execute an ordinary brake control of applying a braking force corresponding to the operating force provided by the driver, without executing the EBD or ABS control, and may also be designed so that execution of one or both of the EBD control and the ABS control is avoided.

As shown in FIG. 1, this electronic control brake system 1 has a master cylinder 14 that delivers hydraulic oil to wheel cylinders 48FL-RR (hereinafter, the front left and right wheels are indicated by reference characters FL, FR, and the rear left and right wheels are indicated by reference characters RL, RR. The characters FL, FR, RL, RR are used to indicate component elements corresponding to the individual wheels, and FL-RR indicates inclusion of all the four wheels.), in response to the depressing operation of the brake pedal 12 performed by the driver. The brake pedal 12 is provided with a pedal stroke sensor 13 that detects the amount of depression of the brake pedal, that is, the pedal stroke.

Oil pressure supply channels 15, 17 extend from the master cylinder 14. Of the two channels, an oil pressure supply channel 15 (that can be regarded as a communication passageway in the invention) is connected with a stroke simulator 18 via a simulator cutoff valve 16 that is normally open (which can be regarded as a second open-close valve in the invention). The stroke simulator 18 produces a pedal stroke corresponding to the depressing force applied to the brake pedal 12 by a driver. Master cutoff valves 20 (that can be regarded as a first open-close valve in the invention) and 22 that are normally closed are disposed on extensions of the oil pressure supply channels 15, 17. Master pressure sensors 24, 26 that detect the hydraulic pressure in the oil pressure supply channels 15, 17 are disposed at an upstream side (the master cylinder 14 side) of the master cutoff valves 20, 22. Hereinafter, the stroke sensor 13 and the master pressure sensors 24, 26 combined will be referred to as "operation detector portion 2".

An end of an oil pressure discharge channel 32 is connected to a reservoir 28. An intermediate portion of an oil pressure supply channel 30 branching from the oil pressure discharge channel 32 is provided with a pump 36 that is actuated by an electric motor 34 and an accumulator 38 that stores the oil pressure increased by actuating the pump 36. An accumulator pressure sensor 40 for detecting an internal pressure in the accumulator 38 is disposed on an intermediate portion of the oil pressure supply channel 30. A relief valve 44 for returning hydraulic oil to the reservoir 28 if the pressure in the oil pressure supply channel 30 becomes high is provided between the oil pressure supply channel 30 and the oil pressure discharge channel 32. Hereinafter, the electric motor 34, the pump 36, the accumulator 38, the accumulator pressure sensor 40 and the relief valve 44 will be collectively referred to as "pressurization source 4".

A portion of the oil pressure supply channel 30 opposite from the pressurization source 4 branches into four lines that are connected to the wheel cylinders 48FL-RR that actuate brake devices (not shown) disposed at the individual wheels, via connecting passageways, that is, oil pressure supply channels 46FL-RR. Similarly, another end portion of the oil pressure discharge channel 32 also branches into four sections that are connected to intermediate portions of the oil pressure supply channels 46FL-RR connected to the wheel cylinders 48FL-RR of the individual wheels. Hereinafter, the connecting passages to the oil pressure supply channels 46FL-RR will be referred to as "oil pressure discharge channels 50FL-RR". It is to be noted herein that portions of the oil pressure discharge channels 50FL, 50RL serve also as portions of the oil pressure supply channels 46FL, 46RL. Furthermore, each wheel is provided with a wheel speed sensor 60FL-RR that detects the rotation speed of the wheel.

Each of the oil pressure supply channels 46FL-RR at an upstream side (the pump 36 side) of the connecting portions between the oil pressure supply channels 46FL-RR and the oil pressure discharge channels 50FL-RR is provided with an electromagnetic flow control valve (hold valve) 52FL-RR. Each of the oil pressure supply channels 46FL-RR at a downstream side (the wheel cylinder 48FL-RR side) of the connecting portions is provided with a wheel cylinder (W/C) pressure sensor 56FL-RR for detecting the hydraulic pressure applied to a corresponding one of the wheel cylinders 48FL-RR. An intermediate portion of each of the oil pressure discharge channels 50FL-RR, that is, a portion thereof at an upstream side (the reservoir 28 side) of the connection portions with respect to the oil pressure supply channels 46FL-RR, is provided with an electromagnetic flow control valve (pressure reducing valve) 54FL-RR. Hereinafter, a portion that includes the hold valves 52FL-RR, the pressure reducing 54FL-RR and the W/C pressure sensors 56FL-RR will be referred to as "hydraulic pressure control portion 6".

The oil pressure supply channels 46FL, 46FR are connected to the oil pressure supply channels 15, 17 via the master cutoff valves 20, 22, at a downstream side of the hold valves 52FL, 52FR, respectively. Therefore, the master cylinder 14 and the wheel cylinders 48FL, 48FR are connected via the master cutoff valves 20, 22.

A brake ECU 8 (see FIG. 2), that is, a control portion of the electronic control brake system 1, includes a CPU, a memory, etc., and controls the brake devices by executing a brake control program stored therein. The brake ECU 8 inputs the output signals of the master pressure sensors 24, 26 which indicate the pressure in the master cylinder 14, the output signal of the accumulator pressure sensor 40 which indicates the pressure in the accumulator 38, the output signals of the W/C pressure sensors 56FL-RR which indicate the hydraulic pressures applied to the wheel cylinders 48FL-RR, the output signals of the wheel speed sensors 60FL-RR which indicate the wheel speeds, and the output signal of the pedal stroke sensor 13 which indicates the amount of operation of the brake pedal. Furthermore, the brake ECU 8 outputs a control signal for controlling the operations of the simulator cutoff valve 16, the master cutoff valves 20, 22, the electromagnetic flow control valves 52FL-RR, 54FL-RR, and the electric motor 34, and controls the switching of a warning lamp 70 disposed on the instrument panel near the driver.

In the electronic control brake system 1, the aforementioned ABS control and EBD control are executed. During a normal state, the master cutoff valves 20, 22 are closed, and the simulator cutoff valve 16 is open. When a driver operates the brake pedal 12, the master cylinder 14 generates a hydraulic pressure corresponding to the amount of operation. Since the hydraulic oil partially flows from the oil pressure supply channel 15 into the stroke simulator 18 via the simulator cutoff valve 16, the amount of operation of the brake pedal 12 is adjusted in accordance with the depressing force applied to the brake pedal 12. That is, the amount of pedal operation (pedal stroke) corresponding to the pedal depressing force is generated. The pedal stroke can be detected by the pedal stroke sensor 13, and can also be detected by the master pressure sensors 24, 26. If the values of the pedal stroke detected by the three sensors do not match, it can be determined that there is a sensor abnormality, or that there is an abnormality in the master cylinder 14 or the oil pressure supply channels 15, 17.

In accordance with the detected pedal stroke, the brake ECU 8 sets a target deceleration of the vehicle, and determines the distribution of the braking force to the individual wheels, and sets the amounts of hydraulic pressure to be applied to the wheel cylinders 48FL-RR. The accumulator 38 normally stores a predetermined hydraulic pressure. However, if the hydraulic pressure detected by the accumulator pressure sensor 40 is lower than a required pressure, the electric motor 34 is actuated to operate the pump 36 so as to increase the pressure. Conversely, if the hydraulic pressure is too high, the relief valve 44 is opened so as to release the hydraulic pressure to the reservoir 28.

The hydraulic pressures applied to the wheel cylinders 48FL-RR can be adjusted by changing the states of operation of the corresponding flow control valves 52FL-RR, 54FL-RR. For example, with regard to the wheel cylinder 48FL, the brake ECU 8 compares the wheel cylinder pressure detected by the W/C pressure sensor 56FL with a target hydraulic pressure. If the comparison indicates that pressurization is needed, the brake ECU 8 opens the hold valve 52FL while maintaining the closed state of the pressure reducing valve 54FL. As a result, the hydraulic oil pressurized by the accumulator 38 is supplied to the wheel cylinder 48FL via the oil pressure supply channels 30, 46FL, so that the hydraulic pressure of the wheel cylinder 48FL increases and therefore the braking force increases. Conversely, if the braking force is excessively great and therefore a wheel is locked (during the ABS control), or if the wheel cylinder pressure detected by the W/C pressure sensor 56FL is higher than the target hydraulic pressure, the brake ECU 8 determines that pressure reduction is needed, and then closes the hold valve 52FL and opens the pressure reducing valve 54FL. Therefore, a portion of the hydraulic oil supplied to the wheel cylinder 48FL is returned to the reservoir 28 via the oil pressure discharge channel 50FL, the pressure reducing valve 54FL and the oil pressure discharge channel 32, so that the hydraulic pressure applied to the wheel cylinder 48FL reduces and therefore the braking force reduces. If the wheel cylinder pressure detected by the W/C pressure sensor 56FL is substantially equal to the target hydraulic pressure as in the case where pressure increase or pressure reduction has just been accomplished, the brake ECU 8 determines that it is necessary to maintain the wheel cylinder pressure, and then closes both the hold valve 52FL and the pressure reducing valve 54FL. Therefore, since the outflow of hydraulic oil via the hold valve 52FL and the pressure reducing valve 54FL from the oil pressure supply channel 46FL on the wheel cylinder 48FL side is stopped, the hydraulic pressure applied to the wheel cylinder 48FL is maintained.

If an abnormality occurs in the pressurization source 4 or the hydraulic pressure control portion 6 in the electronic control brake system 1, appropriate distribution of braking force may become impossible, and therefore executing the braking force control may result in unstable vehicle behavior. If such an abnormality is detected, the brake ECU 8 causes a manual braking operation by opening the master cutoff valves 20, 22 and closing the simulator cutoff valve 16, so that the hydraulic pressure generated by the master cylinder 14 is conducted directly to the wheel cylinders 48FL-RR via the oil pressure supply channels 15, 17. If, in this case, the simulator cutoff valve 16 has an opened-state fault, the valve 16 remains open despite the closing control of the valve 16, and the hydraulic oil supplied from the master cylinder 14 escapes toward the stroke simulator, so that the hydraulic pressure applied to the wheel cylinders 48FL-RR reduces and therefore the braking force becomes insufficient. In the electronic control brake system 1 of this embodiment, the brake ECU 8 performs the functions of determining whether the stroke simulator portion (the stroke simulator 18 and the simulator cutoff valve 16) is abnormal during a non-braking state.

Figure 3:
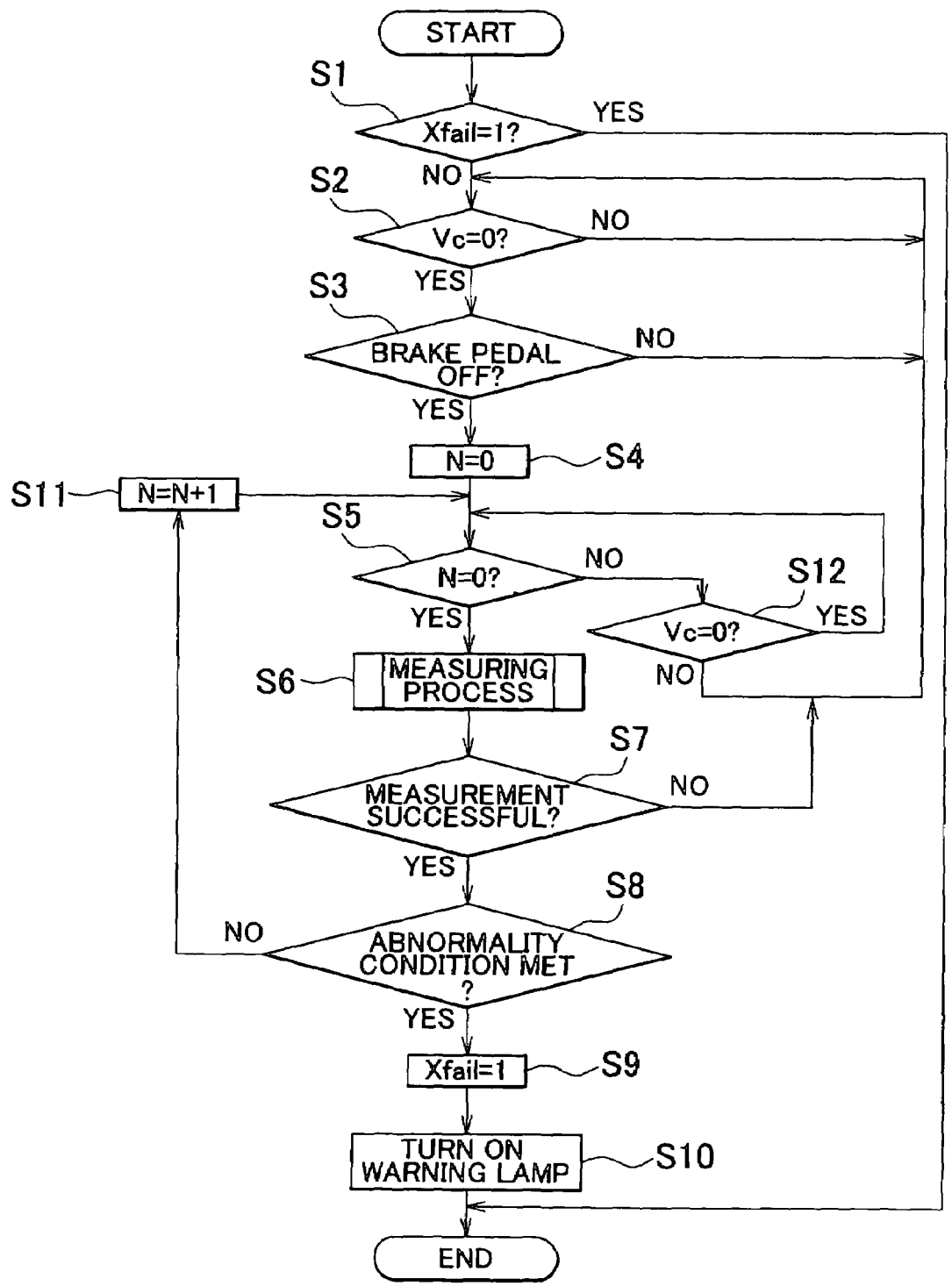
FIG. 3 is a flowchart illustrating an abnormality determining operation regarding the brake system shown in FIG. 1.
Figure 4A:
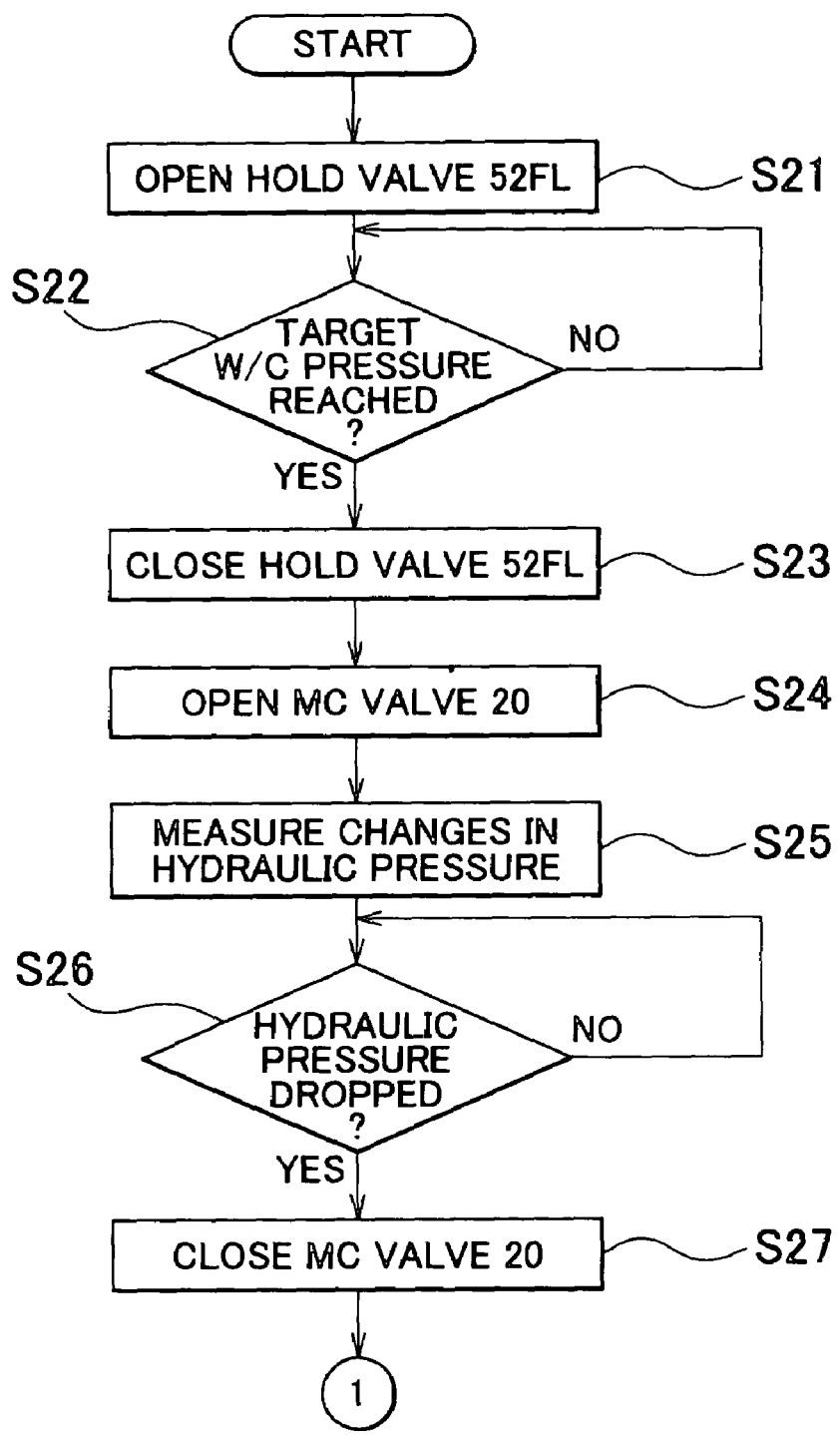
FIGS. 4A and 4B are a flowchart illustrating a content of a measuring process in the flow of operation illustrated in FIG. 3.
Figure 4B:
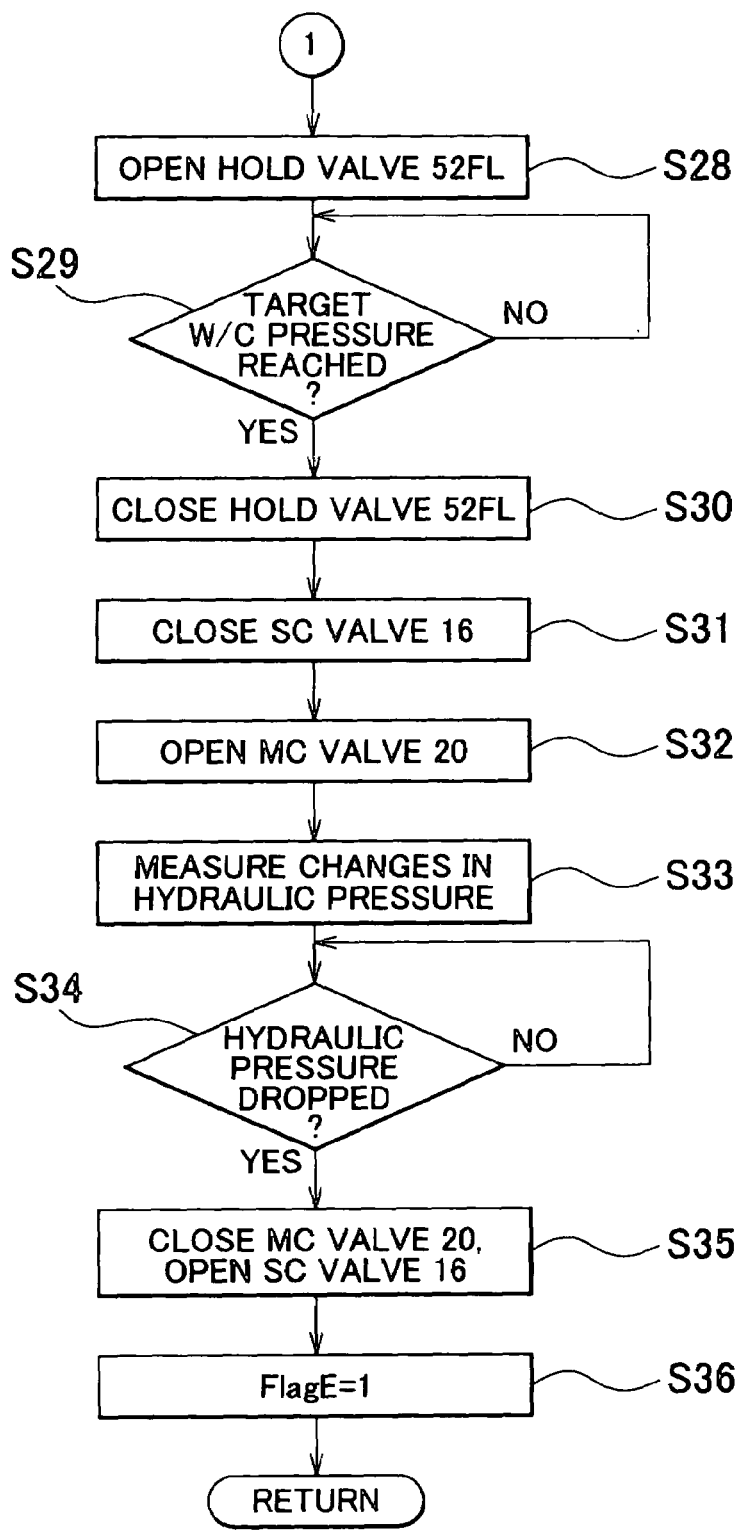
Figure 5A:
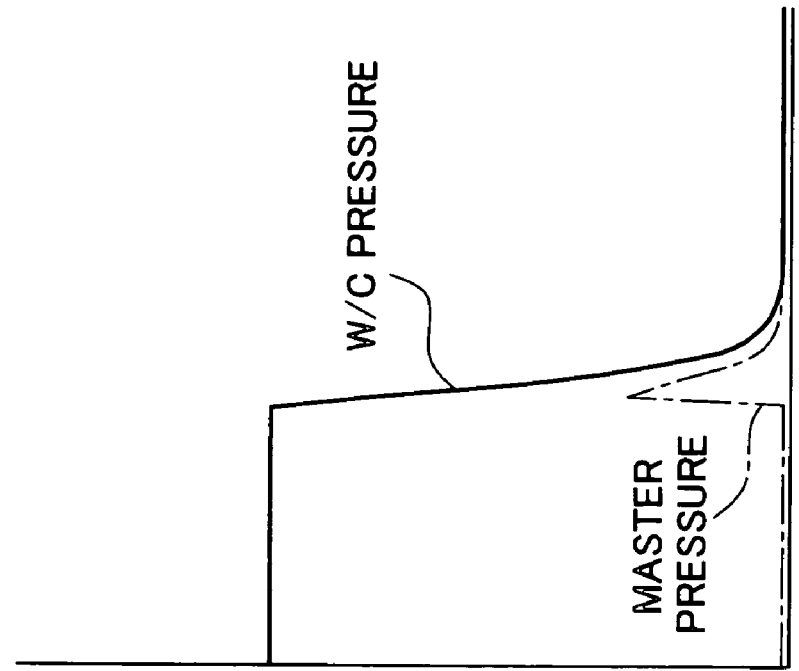
FIGS. 5A and 5B are pressure change graphs indicating pressure changes measured by a W/C pressure sensor and master pressure sensors during the measuring process illustrated in FIGS. 4A and 4B.
Figure 5B:
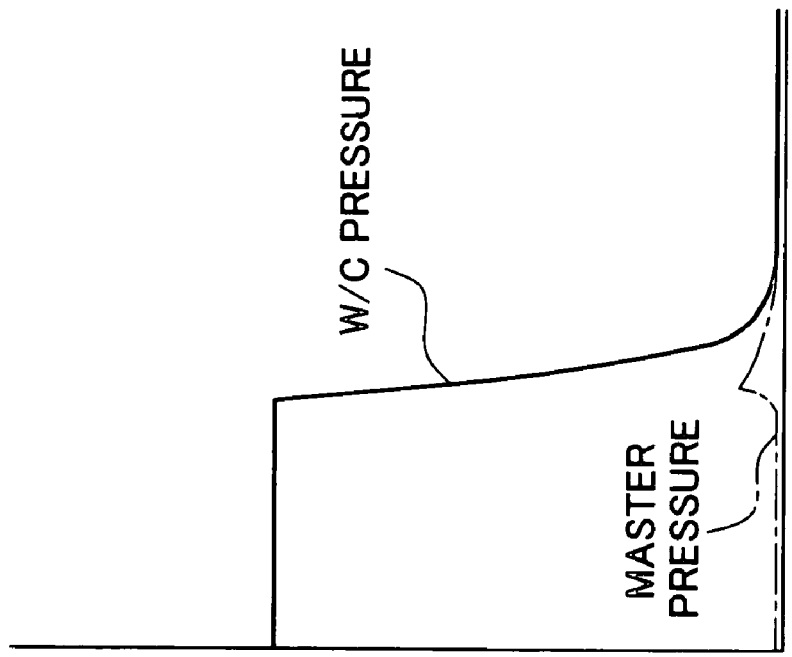
Figure 6:
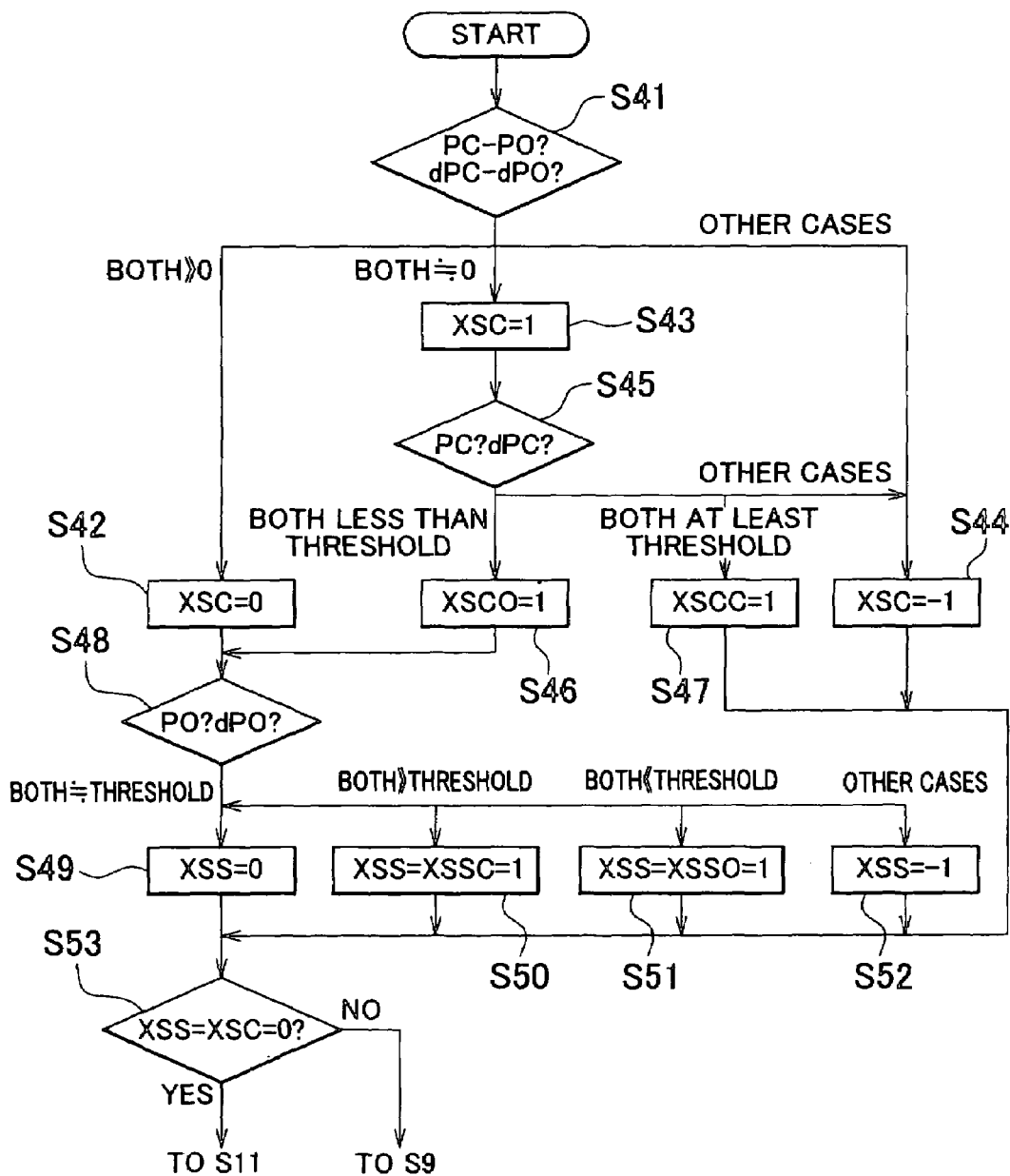
FIG. 6 is a flowchart illustrating a content of an abnormality condition determining process in the flow of operation illustrated in FIG. 3.

FIG. 3 is a flowchart illustrating an abnormality determining operation. FIGS. 4A and 4B is a flowchart illustrating a content of a measuring process executed in the flow of operation illustrated in FIG. 3. FIGS. 5A and 5B are pressure change graphs indicating pressure changes measured by a W/C pressure sensor and the master pressure sensors during the measuring process illustrated in FIGS. 4A and 4B. FIG. 6 is a flowchart illustrating a content of an abnormality condition determining process executed in the flow of operation illustrated in FIG. 3. This abnormality determining process flow starts when an ignition key of the vehicle is turned on. Then, the process flow is repeatedly executed due to the loop operation until an abnormality is detected.

In step S1, it is determined whether an abnormality has already been detected, by checking the value of an abnormality flag Xfail. The value of the flag Xfail is stored in a memory means capable retaining the value of the flag even after the ignition key is turned off, for example, a non-volatile RAM provided inside or outside an engine ECU 8. If the value of the flag Xfail is "1", it is determined that an abnormality has already been detected, and the process immediately ends without execution of the subsequent steps. If the value of the flag Xfail is not "1", specifically, if the value is "0", the process proceeds to step S2, in which it is determined whether the vehicle speed Vc determined from the outputs of the wheel speed sensors 60FL-RR is "0", that is, whether the vehicle is in a stopped state. If the vehicle speed Vc is not "0" but the vehicle is moving, the process returns to step S2, that is, the process does not proceed until the vehicle speed Vc becomes "0", that is, until the vehicle stops. If the vehicle speed Vc is "0", that is, the vehicle is in the stopped state, the process proceeds to step S3, in which it is determined whether the amount of driver's brake pedal operation detected by the stroke sensor 13 is within a range that indicates a pedal-off state. If it is determined that the brake pedal is in an on-state, that is, the driver is operating the brake pedal, the process returns to step S2, thus entering the loop operation of waiting for fulfillment of the conditions of a vehicle stop and a non-operated state of the brake. If the conditions are met, the process proceeds to step S4.

In step S4, the value of an execution determination counter N for abnormality determination is reset to "0". Subsequently in step S5, the value of the execution determination counter N is checked. If the value of the counter N is "0", the process proceeds to step S6, in which a measuring process is executed. The content of the measuring process is illustrated in FIGS. 4A and 4B. During this process, the ECU 8 monitors the vehicle speed and the amount of brake operation. If the vehicle moves or the driver performs a brake operation, a measurement end flag FlagE is set at "0", which indicates that the measurement is not completed. After that, the measuring process is stopped.

First, while the master cutoff (MC) valve 20 separating the hydraulic pressure control portion 6 and the master cylinder 14 from each other is kept in a normal closed state, the hold valve 52FL is opened, so as to apply hydraulic pressure from the pressurization source 4 to the wheel cylinder 48FL (step S21). When the hydraulic pressure measured by the W/C pressure sensor 56FL reaches a targeted wheel cylinder pressure (W/C pressure) (step S22), the hold valve 52FL is closed, so that a predetermined hydraulic pressure is contained within the wheel cylinder 48FL (step S23). Subsequently, while the simulator cutoff (SC) valve 16 is kept in a normal open state, the master cutoff valve 20 is opened, so that the hydraulic pressure contained in the wheel cylinder 48FL is released to the side of the master cylinder 14 (step S24). The released hydraulic pressure returns to the reservoir 28 via the master cylinder 14 within a short time. The transitional changes in hydraulic pressure that occur during this process are measured by the master pressure sensor 24 (step S25). FIG. 5A is a pressure change graph indicating the changes in pressure measured by the W/C pressure sensor 56FL and the master pressure sensor 24 during this process. In step S25, the maximum pressure measured by the master pressure sensor 24 and the maximum rising gradient thereof are stored into a memory as PO and dPO, respectively. After a predetermined time elapses, or after the difference between the pressure values indicated by the master pressure sensor 24 and the W/C pressure sensor 56FL becomes equal to or less than a predetermined value (step S26), the master cutoff valve 20 is closed (step S27).

Subsequently, the hold valve 52FL is opened again, so as to apply hydraulic pressure from the pressurization source 4 to the wheel cylinder 48FL (step S28). When the hydraulic pressure measured by the W/C pressure sensor 56FL exceeds a predetermined hydraulic pressure (step S29), the hold valve 52FL is closed, so that a predetermined hydraulic pressure is contained within the wheel cylinder 48FL (step S30). Subsequently, the simulator cutoff valve 16 is closed (step S31). Then, while the closed state of the valve 16 and the closed state of the hold valve 52FL are maintained, the master cutoff valve 20 is opened, so that the predetermined hydraulic pressure contained in the wheel cylinder 48FL is released to the side of the master cylinder 14 (step S32). The released hydraulic pressure returns to the reservoir 28 via the master cylinder 14 within a short time. The transitional changes in hydraulic pressure that occur during this process are measured by the master pressure sensor 24 again (step S33). FIG. 5B is a pressure change graph indicating the changes in pressure measured by the W/C pressure sensor 56FL and the master pressure sensor 24 during this process. In step S33, the maximum pressure measured by the master pressure sensor 24 and the maximum rising gradient thereof are stored into the memory as PC and dPC, respectively. After a predetermined time elapses, or after the difference between the pressure values indicated by the master pressure sensor 24 and the W/C pressure sensor 56FL becomes equal to or less than a predetermined value (step S34), the master cutoff valve 20 is closed and the simulator cutoff valve is opened (step S35). Subsequently, the measurement end flag FlagE is set at "1", which indicates an end of measurement (step S36).

When the measuring process ends or is stopped, the process returns to step S7 in FIG. 3, in which the measurement end flag FlagE is checked to determine whether the measurement has been successful. If the measurement is not successful, the process returns to step S2, so that re-measurement is performed if the conditions are met. If the measurement has ended, the process proceeds to step S8, in which it is determined whether an abnormality condition is met. A specific process of this step is illustrated in FIG. 6. First, it is verified whether both the difference PC-PO between PC and PO and the difference dPC-dPO between dPC and dPO measured in steps S25, S33 are significant differences (step S41). Table 1 shows the values of PO, PC, dPO and dPC that are expected during the normal state of the simulator cutoff valve 16 and during the abnormal state thereof if there is no abnormality except for the simulator cutoff valve 16. In Table 1, 0<P0<P1, and 0<dP0<dP1.

TABLE 1

|  | Normal | Opened-state fault (valve closing abnormality, i.e., unable to close) | Closed-state fault (valve opening abnormality, i.e., unable to open) |
| --- | --- | --- | --- |
| PC | P1 | P0 | P1 |
| PO | P0 | P0 | P1 |
| PC − PO | P1 − P0 >> 0 | 0 | 0 |
| dPC | dP1 | P0 | dP1 |
| dPO | dP0 | P0 | dP1 |
| dPC − dPO | dP1 − dP0 >> 0 | 0 | 0 |

As can be understood from Table 1, if the simulator cutoff valve 16 functions normally, the relationship of PC-PO>>0 (PC-PO is greater than a first predetermined value that is greater than 0) and the relationship of dPC-dPO>>0 (dPC-dPO is greater than a second predetermined value that is greater than 0) are established. If the simulator cutoff valve 16 has an abnormality (the opened-state fault or the closed-state fault), PC-PO≈0 and dPC-dPO≈0. In other cases, it is considered that there is a fault that cannot be determined merely from PC-PO and dPC-PO. Therefore, if it is determined in step S41 that PC-PO>>0 and dPC-dPO>>0, the process proceeds to step S42, in which a simulator cutoff valve fault flag XSC is set at "0", which indicates that the simulator cutoff valve 16 is normal. Conversely, if it is determined in step S41 that PC-PO≈0 and dPC-dPO≈0, the process proceeds to step S43, in which the simulator cutoff valve fault flag XSC is set at "1", which indicates that the simulator cutoff valve 16 is abnormal. If it is determined in step S41 that the relationships regarding PC-PO and dPC-dPO are other than the aforementioned relationships, the process proceeds to step S44, in which the simulator cutoff valve fault flag XSC is set at "−1", which indicates that the determination is impossible.

Step S43 is followed by step S45, in which the values of PC and dPC are verified. As can be understood from Table 1, the values of PC and dPC in the case of the opened-state fault are lower than a value P1 that is normal during the closed valve state. Therefore, threshold values Pth1, dPth1 that satisfy P0<Pth1<P1, dP0<dPth1<dP1 are set. If the relationships of 0<PC<Pth1 and 0<dPC<dPth1 hold, it is determined that the simulator cutoff valve 16 has an opened-state fault. Then, the process proceeds to step S46, in which an opened-state fault flag XSCO is set at "1" (initially set at "0"). In the case of the closed-state fault, the values of PO and dPO are higher than a value P0 that is normal during the open valve state, as can be understood from Table 1. In this case, PC≈PO and dPC≈dPO hold. Therefore, if the relationships of PC≧Pth1 and dPC≧dPth1 hold, it is determined that the simulator cutoff valve 16 has a closed-state fault, and the process proceeds to step S47, in which a closed-state fault flag XSCC is set at "1" (initially set at "0"). In the other cases, the process proceeds to step S44, in which the simulator cutoff valve fault flag XSC is set at "−1", which indicates that the determination is impossible.

In the case where it is determined that the simulator cutoff valve 16 is normal or the case where it is determined that the simulator cutoff valve 16 has an opened-state fault, the process proceeds from step S42 or step S46 to step S48, in which the state of the stroke simulator 18 is determined on the basis of PO and dPO.

TABLE 2

|  | Normal | Blocked fault | Leaking fault |
| --- | --- | --- | --- |
| PO | P0 | >P0 | <P0 |
| dPO | dP0 | >dP0 | <dP0 |

As is apparent from Table 2, if the stroke simulator 18 functions normally, the relationships of PO≈P0 (PO is within a first range) and dPO≈dP0 (dPO is within a second range) hold. If the inflow of hydraulic oil is small due to fixation, blocking, etc., on the stroke simulator side, PO>>P0 (PO is greater than the upper limit value of the first range) and dPO>>dP0 (dPO is greater than the upper limit value of the second range) hold. If there occurs a leak or the like on the side of the stroke simulator 18, PO<<P0 (PO is less than the lower limit value of the first range) and dPO<<dP0 (dPO is less than or equal to the lower limit value of the second range) hold. Therefore, if it is determined in step S48 that PO≈P0 and dPO≈dP0, the process proceeds to step S49, in which a simulator fault flag XSS is set at "0", which indicates that the stroke simulator 18 is normal. Conversely, if it is determined in step S48 that PO>>P0 and dPO>>dP0, the process proceeds to step S50, in which the simulator fault flag XSS is set at "1", which indicates that the stroke simulator 18 has an abnormality, and a simulator blocked fault flag XSSC is set at "1" (the initial value being "0"), which indicates that the stroke simulator 18 has a blocked fault. If it is determined in step S48 that PO<<P0 and dPO<<dP0, the process proceeds to step S51, in which the simulator fault flag XSS is set at "1", which indicates that the stroke simulator 18 has an abnormality, and a simulator leaking fault flag XSSO is set at "1" (the initial value being "0"), which indicates that the stroke simulator 18 has a leaking fault. If it is determined in step S48 that none of the aforementioned cases is the present case, the process proceeds to step S52, in which the simulator fault flag XSS is set at "−1", which indicates that the determination is impossible.

After the end of steps S49–S52 and S44, S48, the process proceeds to step S53. If the simulator cutoff valve fault flag XSC and the simulator fault flag XSS are both "0" indicating the normal state, it is considered that the abnormality condition is not fulfilled, and the process proceeds to step S11 in the flowchart of FIG. 3. Conversely, if at least one of the two flags is other than "0" (that is, if at least one of the flags is 1 or −1), it is determined that the abnormality condition is fulfilled, and the process proceeds to step S9 in the flowchart shown in FIG. 3.

In step S9, the value of the abnormality flag Xfail is set at "1". Subsequently, the warning lamp 70 is turned on (step S10), thereby notifying the driver that the stroke simulator portion has an abnormality. Although in this embodiment, the warning lamp 70 is turned on, the content of an abnormality may be indicated through the use of a crystalline liquid display device, and an abnormality may also be indicated via voice output from a speaker (not shown) or the like.

If no abnormality is detected, "1" is added to the execution determination counter N in step S11, and the process returns to step S5. If the process proceeds from step S11 to step S5, the value of the execution determination counter N becomes "1". Therefore, the answer to step S5 is "NO", which is followed by step S12. In step S12, it is determined whether the vehicle speed Vc is "0". If the vehicle speed Vc is "0", that is, if the vehicle is in the stopped state, the process proceeds to step S5. Hence, if the value of the execution determination counter N is not "0", specifically, if abnormality determination regarding the stroke simulator portion has been executed once during a stop, the loop process via step S5 and step S12 is executed, so as to avoid a repeated abnormality determination. If the vehicle speed Vc is not "0", the process returns to step S2. Therefore, if after a determination of abnormality, the vehicle is started and then stopped and the brake is not operated, determination regarding abnormality can be executed again.

Thus, determination regarding abnormality of the stroke simulator and the simulator cutoff valve can be executed with high accuracy by increasing the wheel cylinder hydraulic pressure while the brake is not operated during a stop of the vehicle, and then releasing the wheel cylinder hydraulic pressure to the master cylinder side, and detecting a change in the master pressure caused by the pressure release. Therefore, abnormality in the master cylinder system can be detected in an early period, so that backup operation can be reliably carried out if an abnormality should occur in the electronic control system. The increasing and releasing of the wheel cylinder hydraulic pressure for detection of an abnormality is executed while the brake is not operated during a stop of the vehicle. Therefore, the increasing and releasing of the wheel cylinder hydraulic pressure does not affect the vehicle behavior, that is, the abnormality detecting operation does not cause a driver or an occupant to feel uncomfortable. This abnormality detection can be carried out within a short time. Furthermore, if the vehicle runs or a brake operation is performed, the measurement for abnormality detection is aborted to provide higher priority for the driver's operation. Thus, drivability does not degrade. Furthermore, detection of abnormality in relation to the stroke simulator can be realized without a need to add a device or the like.

The operation flow of abnormality detection in accordance with the invention is not limited to what is described above. For example, although the foregoing embodiment uses both the maximum value of pressure and the maximum rising gradient thereof for the abnormality determination, it is also possible to use only one of the two factors for the determination. Still further, although the foregoing embodiment uses the difference in pressure and the difference in pressure rising gradient between the opening control and the closing control for the abnormality determination, it is also possible to compare the pressures or the pressure rising gradients that occur during the opening control and during the closing control for the determination. Furthermore, the valve closing abnormality (opened-state fault) and the valve opening abnormality (closed-state fault) can also be detected by releasing the wheel cylinder pressure during the valve closing control and the valve opening control, respectively. During the valve opening control, abnormalities on the stroke simulator side can be detected as well.

Although an embodiment of the invention is described in terms of the electronic control brake system 1 in which the simulator cutoff valve 16 is disposed upstream of the stroke simulator 18, the invention is also applicable to an electronic control brake system that does not incorporate the simulator cutoff valve 16. Such an electronic control brake system is equivalent to the above-described electronic control brake system with the simulator cutoff valve 16 being always open. Therefore, in such an electronic control brake system, steps S28–S35 are unnecessary, and it is appropriate to execute only steps S1–S27 and S36. When making an abnormality determination in such an electronic control brake system, it can be determined whether the stroke simulator is abnormal, by detecting pressure changes via the master pressure sensor 24 when the master cutoff valve 20 is opened to release the wheel cylinder pressure, and by employing a technique similar to steps S48 to S52.

As is apparent from the foregoing description, the embodiment allows determination of abnormality of the stroke simulator disposed between the master cutoff valve and the master cylinder, during a stop of the vehicle with the brake not operated, by increasing the wheel cylinder pressure via the pressurization source, and then opening the master cutoff valve to release the hydraulic pressure toward the master cylinder, and detecting changes in the master pressure during the release process. If a simulator cutoff valve is provided for blocking the communication between the stroke simulator and the master cylinder, abnormalities of the simulator cutoff valve can be detected as well. Therefore, abnormalities in the master cylinder system can be detected during an early period. Hence, if the stroke simulator portion fails, the stroke simulator can be repaired early on. Hence, if an abnormality of the electronic control system is detected and the master cylinder system is used as a backup system for braking, the master cylinder system does not have an unexpected failure; therefore, the driver can operate the brake system with a feeling of security.

What is claimed is:

1. A vehicular braking control apparatus comprising:
   a master cylinder that generates a hydraulic pressure corresponding to a brake operating force;
   a first communication passageway that connects the master cylinder and a wheel cylinder of a braking apparatus in communication;
   a first open-close valve disposed on the first communication passageway;
   a stroke simulator that is connected to the first communication passageway between the first open-close valve and the master cylinder and that provides a reaction force corresponding to the brake operating force;
   a pressurization source that generates a predetermined hydraulic pressure;
   a hydraulic pressure adjusting portion that connects the pressurization source and the first communication passageway between the first open-close valve and the wheel cylinder and adjusts the hydraulic pressure applied to the wheel cylinder;
   a hydraulic pressure sensor that detects the hydraulic pressure on the first communication passageway between the first open-close valve and the master cylinder; and
   a control portion that, while a brake is not operated, closes the first open-close valve, and controls the hydraulic pressure adjusting portion so as to increase the hydraulic pressure on a wheel cylinder side of the first communication passageway while maintaining a closed state of the first open-close valve, and then opens the first open-close valve, and determines whether there is an abnormality of the stroke simulator based on a change in outputs of the hydraulic pressure sensor before and after the first open-close valve is opened.

2. The vehicular braking control apparatus according to claim 1, wherein the control portion determines whether there is an abnormality of the stroke simulator based on a maximum value of pressure measured by the hydraulic pressure sensor when the first open-close valve is opened, and a maximum rising gradient of the measured pressure.

3. The vehicular braking control apparatus according to claim 1, wherein the stroke simulator comprises a second open-close valve and a stroke simulator body, and wherein the stroke simulator body is connected to the first communication passageway via the second open-close valve, and wherein the control portion performs an abnormality detection regarding the second open-close valve in an abnormality detection regarding the stroke simulator.

4. The vehicular braking control apparatus according to claim 3, wherein the control portion determines whether there is a valve closing abnormality of the second open-close valve by opening the first open-close valve while controlling the second open-close valve to a closed state.

5. The vehicular braking control apparatus according to claim 3, wherein the control portion determines whether there is an abnormality of the stroke simulator body by opening the first open-close valve while controlling the second open-close valve to an open state.

6. The vehicular braking control apparatus according to claim 3, wherein the control portion determines whether there is an abnormality of the stroke simulator by comparing a first output of the hydraulic pressure sensor that occurs when the first open-close valve is opened while the second open-close valve is controlled to the open state and a second output of the hydraulic pressure sensor that occurs when the first open-close valve is opened while the second open-close valve is controlled to the closed state.

7. The vehicular braking control apparatus according to claim 6, wherein the first output includes at least one of a first maximum value of a first pressure measured by the hydraulic pressure sensor when the first open-close valve is opened, and a first maximum rising gradient of the measured first pressure, and wherein the second output includes at least one of a second maximum value of a second pressure measured by the hydraulic pressure sensor when the first open-close valve is opened, and a second maximum rising gradient of the measured second pressure.

8. The vehicular braking control apparatus according to claim 7, wherein the control portion determines whether there is an abnormality of the second open-close valve based on a first difference between the second maximum value and the first maximum value, and a second difference between the second maximum rising gradient and the first maximum rising gradient.

9. The vehicular braking control apparatus according to claim 8, wherein if the first difference is greater than a first predetermined value and the second difference is greater than a second predetermined value, the control portion determines that the second open-close valve is normal.

10. The vehicular braking control apparatus according to claim 8, wherein if the second maximum value is less than a first threshold value and the second maximum rising gradient is less than a second threshold value, the control portion determines that the second open-close valve is incapable of being opened.

11. The vehicular braking control apparatus according to claim 8, wherein if the second maximum value is at least the first threshold value and the second maximum rising gradient is at least the second threshold value, the control portion determines that the second open-close valve is incapable of being closed.

12. The vehicular braking control apparatus according to claim 7, wherein the control portion determines whether there is an abnormality of the stroke simulator body based on the first maximum rising gradient and the first maximum value.

13. The vehicular braking control apparatus according to claim 12, wherein if the first maximum value is within a first range and the first maximum rising gradient is within a second range, the control portion determines that the stroke simulator body is normal.

14. The vehicular braking control apparatus according to claim 12, wherein if the first maximum value is greater than an upper limit value of the first range and the first maximum rising gradient is greater than an upper limit value of the second range, the control portion determines that the stroke simulator body is in a blocked state.

15. The vehicular braking control apparatus according to claim 12, wherein if the first maximum value is less than a lower limit value of the first range and the first maximum rising gradient is less than a lower limit value of the second range, the control portion determines that the stroke simulator body has a leak of a hydraulic oil for applying hydraulic pressure to the wheel cylinder.

16. The vehicular braking control apparatus according to claim 1, wherein the hydraulic pressure adjusting portion includes a second communication passageway that connects in communication the pressurization source and the first communication passageway between the first open-close valve and the wheel cylinder; and a third open-close valve disposed on the second communication passageway, and wherein the control portion increases the hydraulic pressure on a wheel cylinder side of the first communication passageway to a target value by actuating the pressurization source and keeping the third open-close valve open, and then closes the third open-close valve.

17. The vehicular braking control apparatus according to claim 1, wherein the hydraulic pressure adjusting portion includes a second communication passageway that connects in communication the pressurization source and the first communication passageway between the first open-close valve and the wheel cylinder; a third open-close valve disposed on the second communication passageway: a third communication passageway that connects in communication a master cylinder and the second communication passageway downstream of the third open-close valve; and a fourth open-close valve disposed on the third communication passageway; and wherein the control portion keeps the fourth open-close valve closed during execution of a process for detecting an abnormality of the stroke simulator.

18. The vehicular braking control apparatus according to claim 1, further comprising a notification device that notifies a driver of the vehicle that an abnormality of the stroke simulator has been detected.

19. A method for detecting an abnormality of a braking apparatus that has a stroke simulator that provides a reaction force corresponding to a brake operating force, wherein a first open-close valve is disposed on a communication passageway that connects in communication a wheel cylinder of the braking apparatus and a master cylinder that generates a hydraulic pressure corresponding to the brake operating force, and wherein the stroke simulator is connected to the communication passageway between the first open-close valve and the master cylinder, the method comprising:
increasing a hydraulic pressure on a wheel cylinder side of the communication passageway while the first open-close valve is closed while a brake is not operated;
opening the first open-close valve after increasing the hydraulic pressure on the wheel cylinder side;
measuring a hydraulic pressure in a communication passageway between the first open-close valve and the stroke simulator which occur before and after the first open-close valve is opened; and
determining whether there is an abnormality of the stroke simulator based on a change in the measured hydraulic pressure.

* * * * *